United States Patent
Peralta et al.

(10) Patent No.: US 8,339,772 B2
(45) Date of Patent: Dec. 25, 2012

(54) HEAT DISSIPATION MEANS FOR INCREASING POWER DENSITY IN ENCLOSED EQUIPMENT

(75) Inventors: Hildegard Peralta, Apodaca (MX); Ezequiel Salas, Apodaca (MX); Mauricio Diaz, San Nicolas de los Garza (MX)

(73) Assignee: Schneider Electric USA, Inc., Palatine, IL (US)

( * ) Notice: Subject to any disclaimer, the term of this patent is extended or adjusted under 35 U.S.C. 154(b) by 157 days.

(21) Appl. No.: 12/941,770

(22) Filed: Nov. 8, 2010

(65) Prior Publication Data

US 2012/0113569 A1  May 10, 2012

(51) Int. Cl.
*H05K 7/20* (2006.01)
*H05K 1/02* (2006.01)

(52) U.S. Cl. .............. 361/676; 361/634; 361/679.54; 361/714; 174/16.2; 174/70 B; 174/88 B; 174/99 B

(58) Field of Classification Search .......... 361/679.46, 361/679.54, 634, 675, 676, 677, 624, 626, 361/631, 646; 174/16.2, 50, 70 B, 68.2, 174/68.3, 88 B, 99 B, 72 B; 312/223.2, 223.3, 312/236; 165/104.33, 185, 104.26
See application file for complete search history.

(56) References Cited

U.S. PATENT DOCUMENTS

| | | | | | |
|---|---|---|---|---|---|
| 3,347,975 | A | * | 10/1967 | Shannon | 174/70 B |
| 3,681,509 | A | * | 8/1972 | Johnston et al. | 174/16.2 |
| 3,728,585 | A | * | 4/1973 | Olashaw | 361/677 |
| 4,804,804 | A | * | 2/1989 | Hibbert et al. | 174/16.2 |
| 4,929,801 | A | * | 5/1990 | Hibbert | 174/16.2 |
| 4,945,188 | A | * | 7/1990 | Jackson | 174/16.2 |
| 4,950,841 | A | * | 8/1990 | Walker et al. | 174/88 B |
| 5,854,445 | A | * | 12/1998 | Graham et al. | 174/99 B |
| 6,018,455 | A | * | 1/2000 | Wilkie et al. | 361/676 |
| 6,510,047 | B2 | | 1/2003 | Meiners et al. | |
| 6,574,094 | B1 | * | 6/2003 | Morrow et al. | 361/676 |
| 6,689,956 | B2 | * | 2/2004 | Alexander et al. | 174/72 B |
| 7,819,681 | B1 | * | 10/2010 | Rodrigues et al. | 439/213 |
| 7,916,480 | B2 | * | 3/2011 | Woody et al. | 361/699 |
| 8,169,775 | B2 | * | 5/2012 | Bortoli et al. | 361/677 |
| 2007/0279844 | A1 | * | 12/2007 | Zhang et al. | 361/676 |

OTHER PUBLICATIONS

Square D: Busway Systems, Catalog 5600CT9101R12/09, 2010, Dated Mar. 2010, 148 Pages.

* cited by examiner

*Primary Examiner* — Michael V Datskovskiy
(74) *Attorney, Agent, or Firm* — Nixon Peabody LLP

(57) ABSTRACT

A thermally efficient electrical enclosure includes a busbar, a metallic heat sink, and an electrical insulator. The busbar is positioned entirely within the enclosure and electrically insulated from the enclosure. The metallic heat sink is attached to a wall of the enclosure. The electrical insulator physically contacts the busbar and is at least partially wrapped around at least two non-parallel surfaces of a portion of the metallic heat sink such that the metallic heat sink is electrically insulated from the busbar. The metallic heat sink is configured to transfer thermal energy or heat from the busbar to the enclosure such that the thermal energy is lost or transferred to the surrounding environment, which reduces the temperature of the busbar and the amount of copper needed for the busbar without reducing the rating of the enclosure.

20 Claims, 8 Drawing Sheets

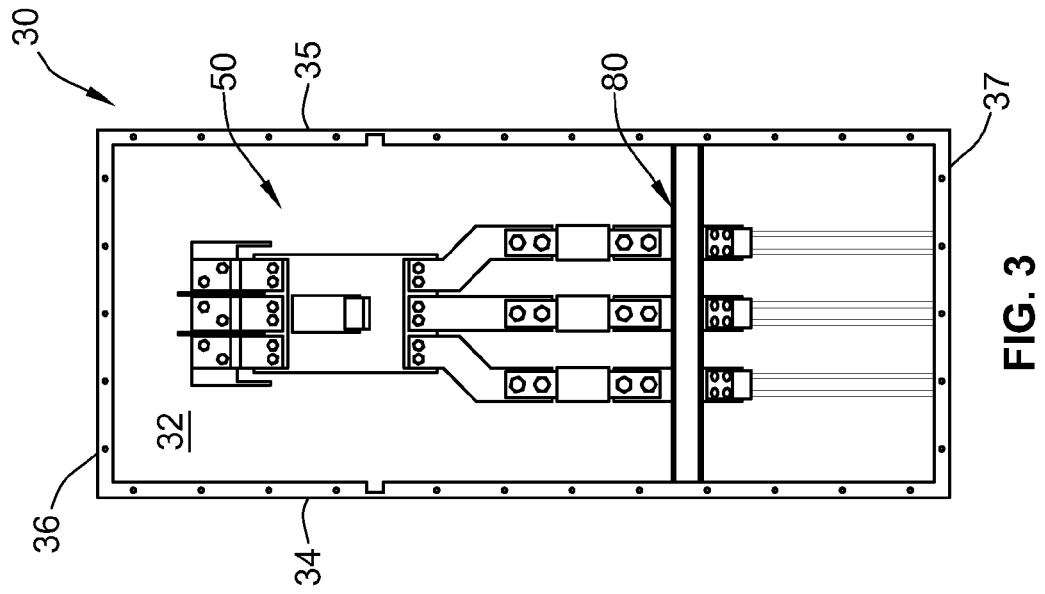
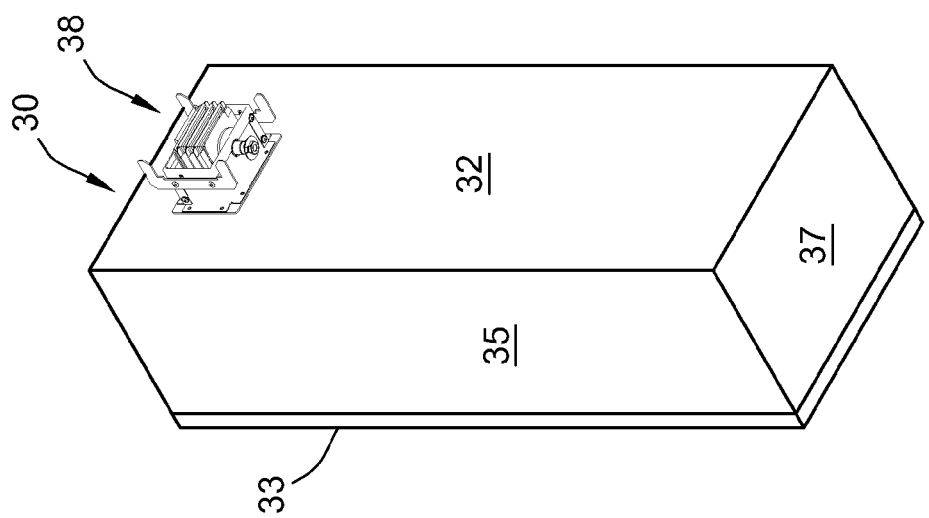
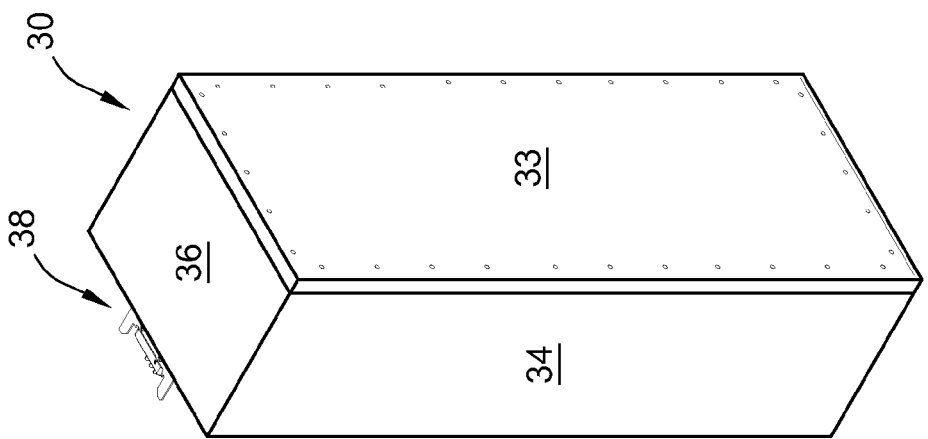
FIG. 3
FIG. 2B
FIG. 2A

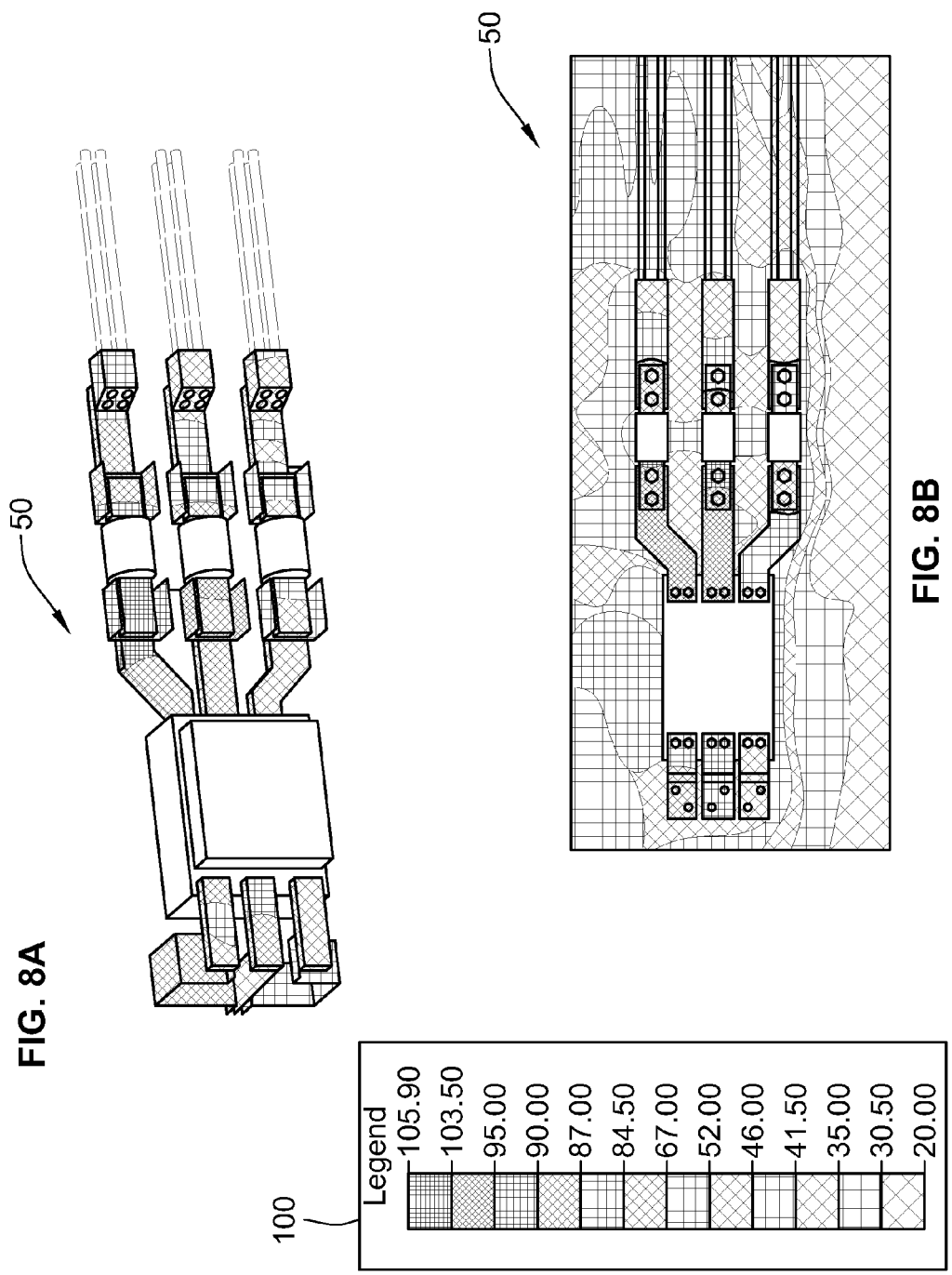

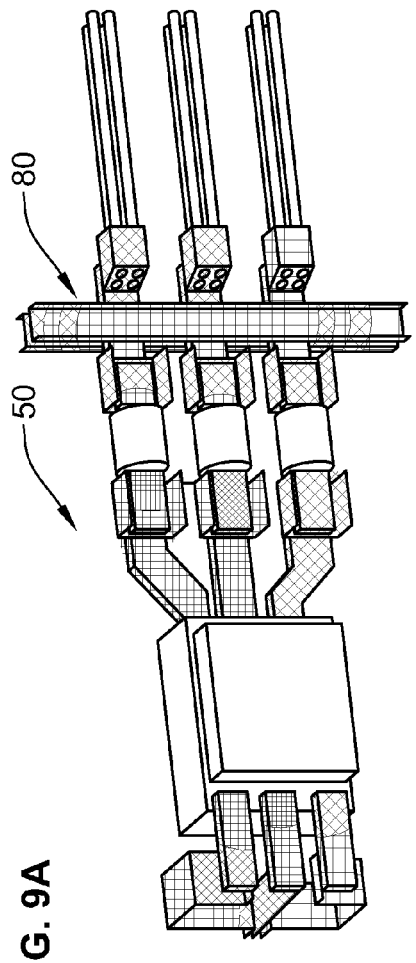
FIG. 9A
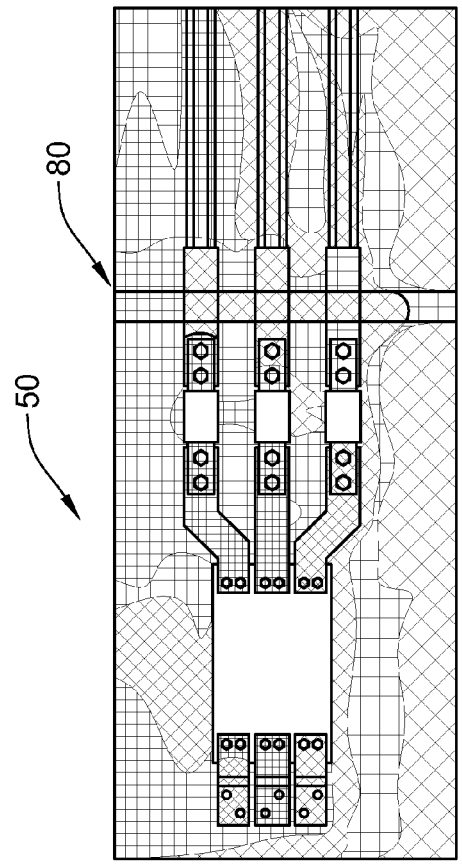
FIG. 9B
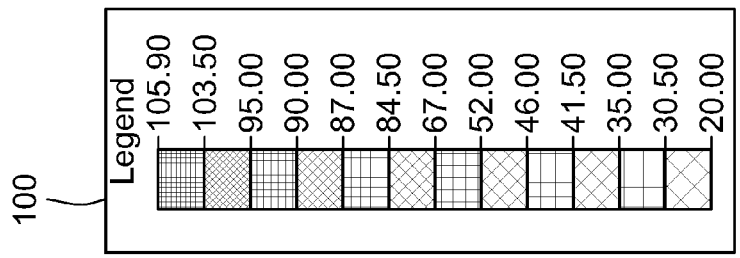

US 8,339,772 B2

HEAT DISSIPATION MEANS FOR INCREASING POWER DENSITY IN ENCLOSED EQUIPMENT

FIELD OF THE INVENTION

The present invention relates generally to electrical distribution equipment and, more particularly, to thermally efficient electrical enclosures.

BACKGROUND OF THE INVENTION

A busway system typically includes one or more busways, one or more busway joint packs, and multiple plug-in units (PIUs). Each busway joint pack is used to physically and electrically connect two sections of busway or two sets of busway together. Various PIUs having electrical components can be directly connected to one or more plug-in connection sites spaced along the busways to draw power. Each PIU includes one or more phase-conductors and a housing. For example, in a three-phase system, the PIU can include three live phase-conductors or three live phase-conductors and one neutral-conductor, depending on the type of system architecture being employed.

A common problem in busway systems is the management of the rise in temperature of the busway system within the PIUs. A rise in temperature within the PIUs limits the overall thermal performance of the busway system, which directly affects the required size of the PIU and/or the size of the phase-conductors. Using larger phase-conductors to accommodate for the rise in temperature at the PIUs increases the size of, and accordingly the costs of, the materials needed to make the busway system. As phase-conductors are typically made of copper and/or aluminum, which can be expensive, such a solution can be expensive. Another problem caused by the rise in temperature at and/or within the PIUs is a potential degradation of the busway system due to excessive heat, melting, deformation, etc.

Thus, a need exists for an improved apparatus and system. The present disclosure is directed to satisfying one or more of these needs and solving other problems.

SUMMARY OF THE INVENTION

The present disclosure is directed to providing a thermally efficient electrical enclosure, such as, for example, a thermally efficient plug-in or bolt-on unit for use with a busway system. The thermally efficient electrical enclosure preferably includes a substantially air-tight exterior enclosure with one or more parallel busbars located therein for conducting one or more phases of electricity. The thermally efficient electrical enclosure transfers thermal energy or heat from the busbars to the exterior enclosure of the thermally efficient electrical enclosure such that the thermal energy is dissipated or transferred to the surrounding environment, which reduces the internal temperature of the thermally efficient electrical enclosure and of the one or more busbars and allows significantly less copper to be used in the busbars without affecting the current or voltage rating of the busway system.

The thermally efficient electrical enclosure includes two thermally conductive and electrical insulators, preferably "C" or "U" shaped sheets for closely fitting two thermally and electrically conductive "C" or "U" shaped metallic heat sinks, although shaping is only one aspect of the present disclosure. The two insulating sheets are wrapped around a portion of respective ones of the metallic heat sinks and are positioned on opposing sides of the one or more parallel busbars such that the metallic heat sinks sandwich the one or more parallel busbars with the two insulating sheets therebetween. The metallic heat sinks are also directly coupled to an interior surface of the exterior enclosure.

The insulating sheets sufficiently electrically insulate the one or more parallel busbars from ground including the exterior enclosure. The insulating sheets are selected with a particular thermal impedance, dielectric strength, and dimensions such that a portion of the thermal energy generated is transferred from the one or more parallel busbars, through the insulating sheets, through the metallic heat sinks, and to the external enclosure.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 2A and 2B are perspective views of the thermally efficient electrical enclosure of FIG. 1;

FIG. 3 is a front view of the thermally efficient electrical enclosure of FIG. 2 with a top wall removed to illustrate a fusible switch system and a heat sink system located therein;

FIG. 8A is a partial perspective view of an electrical enclosure without a heat sink system illustrating a temperature profile of several components within the enclosure;

FIG. 8B is a front view of the electrical enclosure of FIG. 8A illustrating a temperature profile of the enclosure and its components;

FIG. 9A is a partial perspective view of an electrical enclosure with a heat sink system according to aspects of the present disclosure illustrating a temperature profile of several components within the enclosure; and FIG. 9B is a front view of the electrical enclosure of FIG. 9A illustrating a temperature profile of the enclosure and its components.

DETAILED DESCRIPTION OF THE ILLUSTRATED EMBODIMENTS

Although the present disclosure will be described in connection with certain aspects and/or embodiments, it will be understood that the present disclosure is not limited to those particular aspects and/or embodiments. On the contrary, the present disclosure is intended to cover all alternatives, modifications, and equivalent arrangements as may be included within the spirit and scope of the invention as defined by the appended claims.

Figure 1:
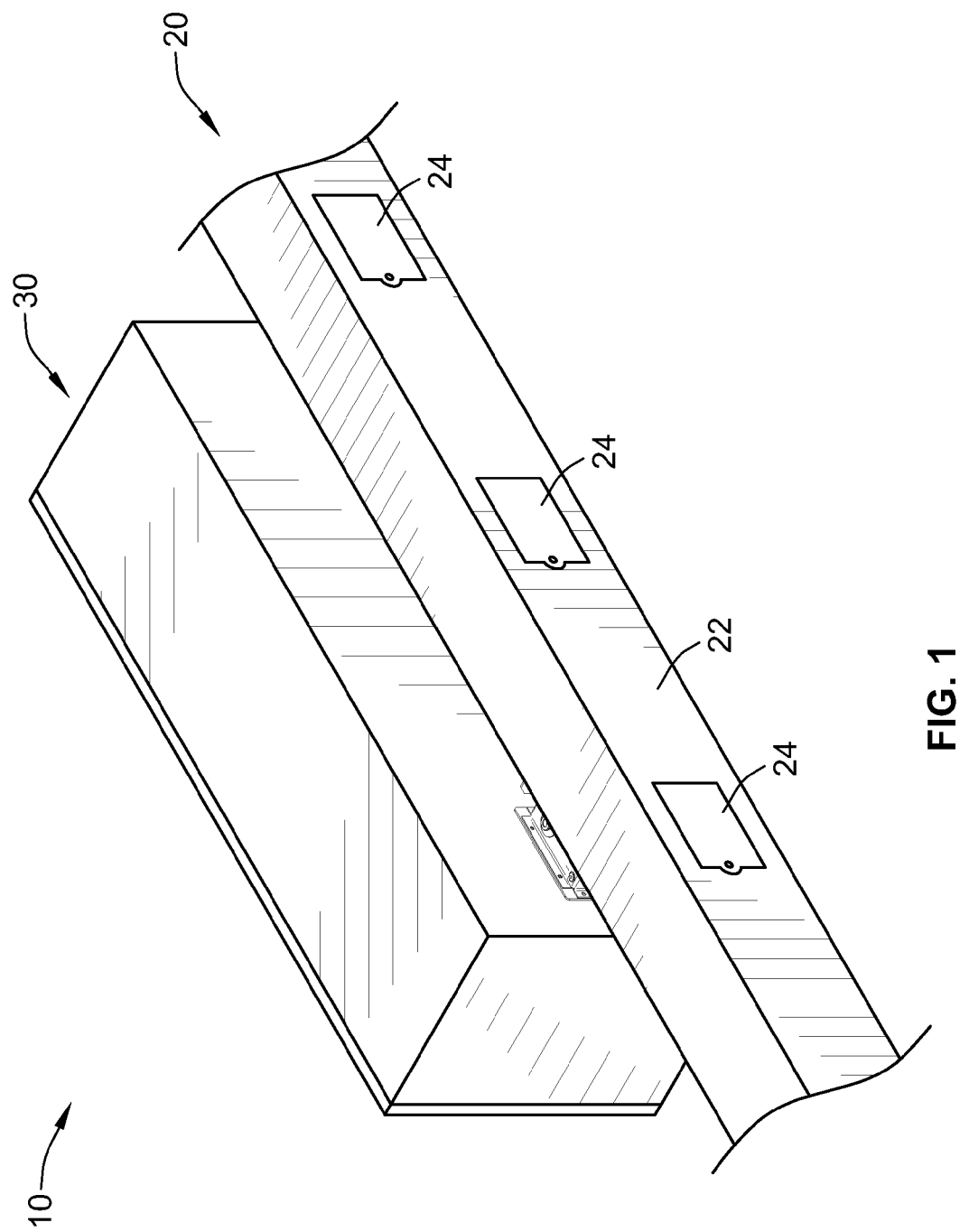
FIG. 1 is a perspective view of a busway system including a busway and a thermally efficient electrical enclosure according to some aspects of the present disclosure.

Referring to FIG. 1, an exemplary busway system 10 is shown. The busway system 10 includes a busway 20, and a thermally efficient electrical enclosure 30 coupled thereto. In the illustrated example, the busway 20 is a three-pole busway, which can also be referred to as a three-phase busway. The busway 20 includes a busway housing 22 and three phase-conductors (not shown) for distributing three separate phases of electricity between a source of electrical current and a load. The busway housing 22 includes a plurality of plug-in connection sites 24 that receive corresponding busway couplers (e.g., busway coupler 38, shown in FIG. 2B) of a variety of different types of electrical enclosures, such as, for example, plug-in units (PIUs) and/or bolt-on units (BOUs).

While the busway system 10 is described as being a three-pole system, it is contemplated that the busway system 10 can alternatively be a four-pole system. In such a configuration, each of the busway sections can include three phase-conductors and one neutral conductor. It is also contemplated that the busway system 10 can be a single pole and/or a single phase system with one phase conductor and one or no neutral conductor.

Referring generally to FIGS. 2A-2B, the thermally efficient electrical enclosure 30 is shown according to an exemplary configuration of the present disclosure. The thermally efficient electrical enclosure 30 is illustrated as a fusible-switch PIU for coupling to one of the plug-in connection sites 24 of the busway 20 via a busway coupler 38. The busway coupler 38 is configured to electrically connect the thermally efficient electrical enclosure 30 to one or more of the plug-in connection sites 24 on the busway 20. The fusible-switch PIU includes a switch in combination with one or more fuses.

The thermally efficient electrical enclosure 30 is substantially air-tight and/or substantially water-tight when fully assembled as shown. The thermally efficient electrical enclosure 30 includes an outer housing or outer enclosure that is formed by several walls. The walls are typically made of steel, but other materials are contemplated, such as, for example, aluminum, copper, etc. The thermally efficient electrical enclosure 30 includes a bottom wall 32, a top wall, 33, a first side wall 34, a second side wall 35, a first end wall 36, and a second end wall 37. The walls 32-37 are attached together to form the outer enclosure of the thermally efficient electrical enclosure 30 via one or more attachment means, such as, for example, nuts and bolts, screws, glue, welding, hinge, etc. Generally, at least a portion of the top wall 32 is removable from the remainder of the outer enclosure such that an operator of the busway system 10 can readily gain access to internal components of the thermally efficient electrical enclosure 30.

Referring to FIG. 3, a front view of the thermally efficient electrical enclosure 30 is shown with the top wall 33 removed to reveal the internal components of the thermally efficient electrical enclosure 30. As shown, the thermally efficient electrical enclosure 30 includes a fusible switch system 50 and a heat sink system 80. The heat sink system 80 physically contacts a portion of the fusible switch system 50 and is directly attached to the first and the second side walls 34, 35 of the thermally efficient electrical enclosure 30 via one or more attachment means, such as, for example, nuts and bolts, screws, glue, welding, rivets, etc. As will be explained in more detail below, the heat sink system 80 transfers thermal energy from the fusible switch system 50 to the first and the second side walls 34, 35 of the thermally efficient electrical enclosure 30 to reduce a temperature of the fusible switch system 50 and/or an internal temperature of the thermally efficient electrical enclosure 30.

Figure 4:
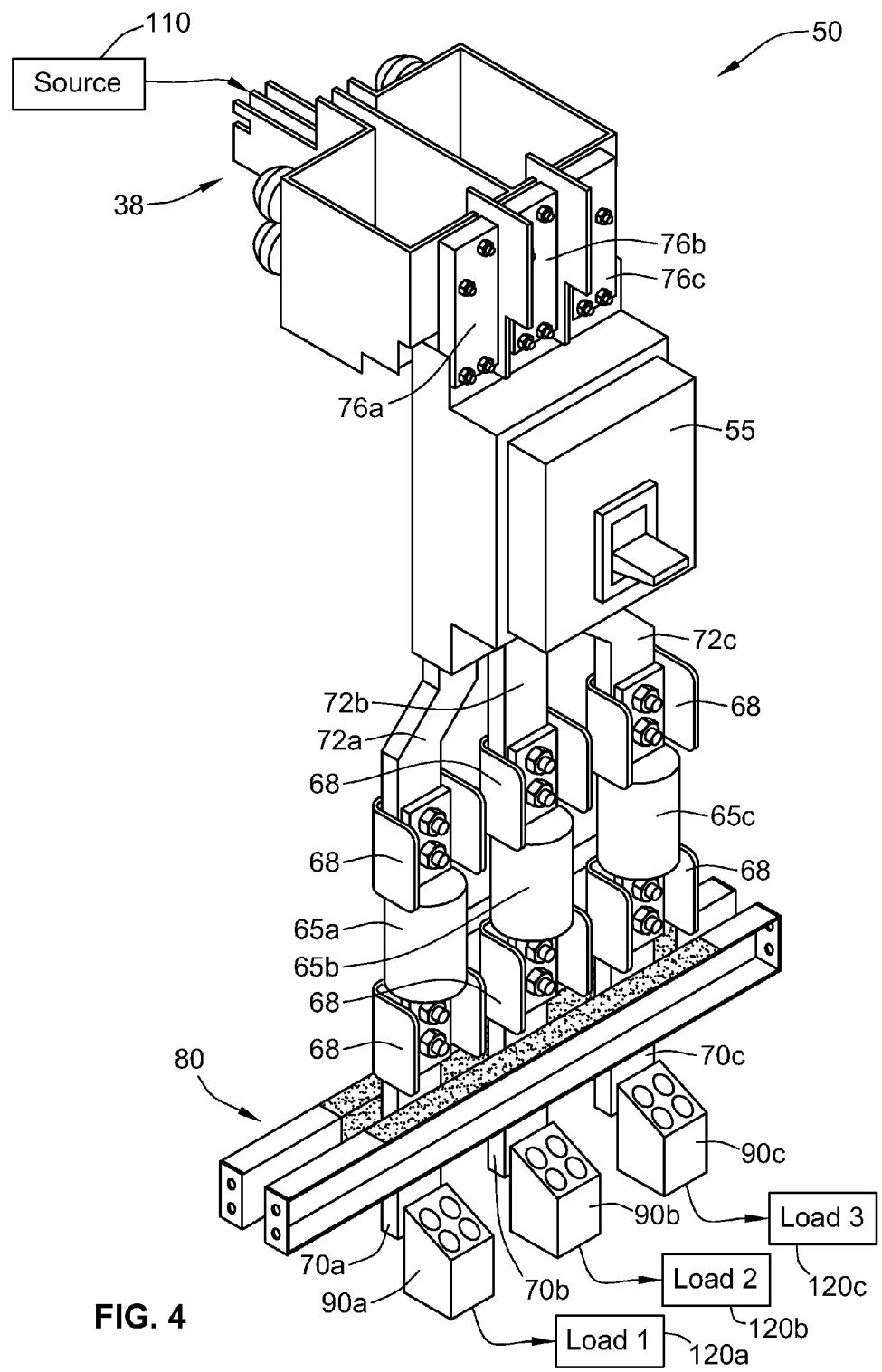
FIG. 4 is a perspective representation of the fusible switch system and the heat sink system of FIG. 3 electrically coupled between a source of electrical current and a load according to some aspects of the present disclosure.

Referring to FIG. 4, the fusible switch system 50 and the heat sink system 80 are shown without the outer housing of the thermally efficient electrical enclosure 30 to better illustrate the components of the two systems. The fusible switch system 50 is a three-phase fusible switch system in that it is configured to selectively distribute three phases of electricity along three electrical distribution paths between a source 110 and one or more loads 120a-c. The fusible switch system 50 includes the busway coupler 38, a switch 55, three fuses 65a-c, and three lugs 90a-c.

The various components of the fusible switch system 50 are electrically coupled via a plurality of busbars or phase conductors. Specifically, a first fuse 65a is electrically coupled to a first lug 90a via a first busbar 70a and to the switch 55 via fourth busbar 72a, a second fuse 65b is electrically coupled to a second lug 90b via a second busbar 70b and to the switch 55 via fifth busbar 72b, and a third fuse 65c is electrically coupled to a third lug 90c via a third busbar 70c and to the switch 55 via sixth busbar 72c. The busway coupler 38 is electrically coupled to the switch 55 via seventh, eighth, and ninth busbars 76a-c.

Each of the three phases of electricity can be distributed along respective ones of the three electrical distribution paths. Specifically, the first phase of electricity can be distributed from the source 110 to the busway coupler 38, through the seventh busbar 76a, through the switch 55, through the fourth busbar 72a, through the first fuse 65a, through the first busbar 70a, through the first lug 70a, and to the first load 120a. Similarly, the second phase of electricity can be distributed from the source 110 to the busway coupler 38, through the eighth busbar 76b, through the switch 55, through the fifth busbar 72b, through the second fuse 65b, through the second busbar 70b, through the second lug 70b, and to the second load 120b; and the third phase of electricity can be distributed from the source 110 to the busway coupler 38, through the ninth busbar 76c, through the switch 55, through the sixth busbar 72c, through the third fuse 65c, through the third busbar 70c, through the third lug 70c, and to the third load 120c. The first, the second, and the third lugs 70a-c can each be electrically coupled to the one or more loads 120a-c via one or more electrical wires attached to the lugs 90a-c as is known in the art.

While current flows through the various components of the fusible switch system 50, heat or thermal energy is generated, which increases the temperature of the components of the fusible switch system 50, such as, for example, the busbars 70a-c. To reduce the temperature of the components of the fusible switch system 50, the heat sink system 80 is provided within the thermally efficient electrical enclosure 30. The heat sink system 80 is configured to increase the heat transfer from the fusible switch system 50 to the first and the second side walls 34, 35, which reduces the temperature of the fusible switch system 50 and the overall temperature inside of the external housing of the thermally efficient electrical enclosure 30. As a result, the current or voltage rating of the busway system can remain the same while using less copper for the busbars 70a-c.

Figure 5:
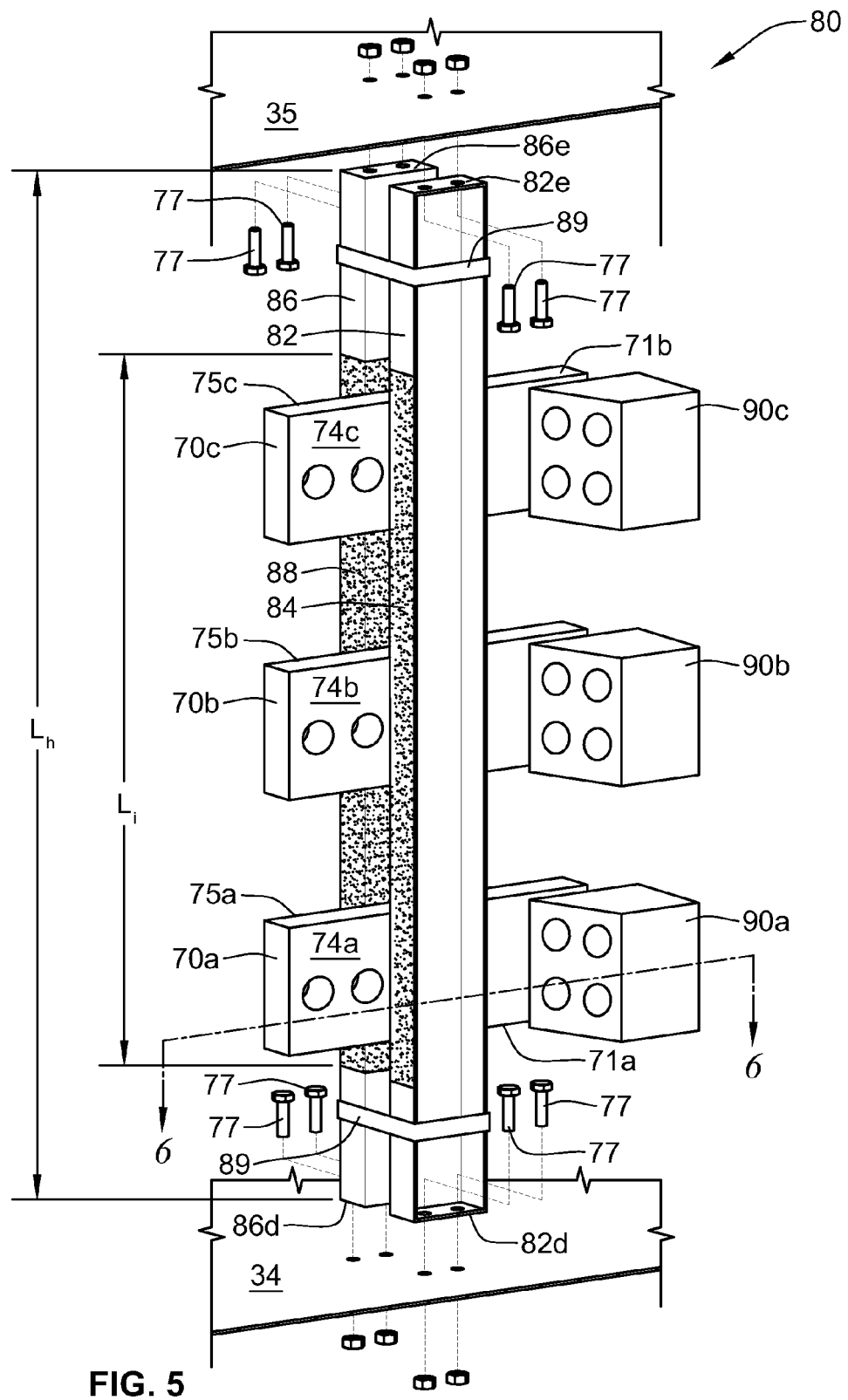
FIG. 5 is an enlarged perspective view of the heat sink system coupled to a portion of the fusible switch system of FIG. 4.

Referring to FIG. 5, a partially exploded, partial perspective view of the heat sink system 80 and the fusible switch system 50 is shown according to some aspects of the present description. The heat sink system 80 includes a first metallic heat sink 82, a second metallic heat sink 86, a first electrical insulator 84, and a second electrical insulator 88. The first electrical insulator 84 is wrapped around a portion of a length, $L_h$, of the first metallic heat sink 82 to electrically insulate the first metallic heat sink 82 from the busbars 70*a-c*. Similarly, the second electrical insulator 88 is wrapped around a portion of a length, $L_h$, of the second metallic heat sink 86 to electrically insulate the second metallic heat sink 86 from the busbars 70*a-c*. By wrapped around it is meant that the electrical insulators are positioned around outer surfaces of the metallic heat sinks, but are not necessarily physically attached or coupled to the metallic heat sinks other than being in close proximity. The wrapping of the electrical insulators aids in preventing through-air arcing between the busbars and metallic heat sinks. That is, the wrapping of the electrical insulators increases the through-air dielectric distance between the busbars and metallic heat sinks.

The first metallic heat sink 82 and the first electrical insulator 84 are positioned adjacent to a first surface 74*a-c* of each of the busbars 70*a-c* such that the first electrical insulator 84 physically contacts the first surface 74*a-c* of each of the busbars 70*a-c* and such that the first electrical insulator 84 electrically insulates the first metallic heat sink 82 from each of the busbars 70*a-c*. Similarly, the second metallic heat sink 86 and the second electrical insulator 88 are positioned adjacent to a second opposing surface 75*a-c* of each of the busbars 70*a-c* such that the second electrical insulator 88 physically contacts the second opposing surface 75*a-c* of each of the busbars 70*a-c* and such that the second electrical insulator 88 electrically insulates the second metallic heat sink 86 from each of the busbars 70*a-c*. To sufficiently electrically insulate the first and the second metallic heat sinks 82,86 from the busbars 70*a-c*, such as, for example, to prevent arcing, the length, $L_i$, of the first and the second electrical insulators 84, 88 is long enough such that the first and the second electrical insulators 84, 88 extend beyond two opposing out-side or outermost side surfaces 71*a,b* of the outermost busbars 70*a,c*. The lengths, $L_h$ and $L_i$, of the first metallic heat sink 82, the first electrical insulator 84, the second metallic heat sink 86, and the second electrical insulator 88 are generally perpendicular to a length of the busbars 70*a-c*, although other orientations are contemplated.

The first metallic heat sink 82 and the second metallic heat sink 86 can be composed of any metallic material, such as, for example, steel, copper, gold, iron, aluminum, etc. Thus, the first metallic heat sink 82 and the second metallic heat sink 86 are configured to extract thermal energy and conduct the energy to a surrounding environment.

The first electrical insulator 84 and the second electrical insulator 88 can be made of any thermally conductive and electrically insulating material, such as, for example, plastic, rubber, LEXAN® (polycarbonate resin thermoplastic), MYLAR® (biaxially-oriented polyethylene terephthalate), polyvinyl chloride (PVC), bulk molded compound or thermoset, etc. Thus, the first and the second electrical insulators 84, 88 are also configured to extract thermal energy and conduct the energy to a surrounding environment.

The first and the second electrical insulators 84, 88 transfer thermal energy and/or heat from the three busbars 70*a-c* to the first and the second metallic heat sinks 82, 86, which transfer thermal energy and/or heat to the first and the second side walls 34, 35, which transfer thermal energy and/or heat to a surrounding environment. This transfer of thermal energy and/or heat reduces an internal temperature of the thermally efficient electrical enclosure 30 and/or the temperature of the internal components of the thermally efficient electrical enclosure 30, such as, for example, the temperature of the three busbars 70*a-c*. The reduction of temperature of the internal components is based on a comparison of the thermally efficient electrical enclosure 30 and an equivalently sized and configured electrical enclosure that does not include a heat sink system 80 as shown in FIGS. 3-6, 7B, 9A, and 9B. A comparison of such two systems is described herein in reference to FIGS. 7A-9B.

Each of the first and the second metallic heat sinks 82, 86 include two opposing end portions. Specifically, the first metallic heat sink 82 includes a first end portion 82*d* and a second opposing end portion 82*e*. Similarly, the second metallic heat sink 86 includes a first end portion 86*d* and a second opposing end portion 86*e*. Each of the end portions 82*d,e* and 86*d,e* can include one or more apertures to aid in directly attaching the first and the second metallic heat sinks 82, 86 to the side wall 34, 35.

The first and the second metallic heat sinks 82, 86 can be directly attached to the first and the second side walls 34, 35 via attachment means 77. As shown, the attachment means 77 are nuts and bolts used to attached the end portions 82*d,e* and 86*d,e* of the first and the second metallic heat sinks 82, 86 directly to the side walls 34, 35, although the attachment means 77 can be one or more of nuts and bolts, screws, glue, welds, rivets, etc. The attachment means 77 should preferably be used to ensure a sufficient surface-to-surface thermal transfer connection between the first metallic heat sink 82 and the first and the second side walls 34, 35 and between the second metallic heat sink 86 and the first and the second side walls 34, 35. By sufficient surface-to-surface thermal transfer connection it is meant that there is physical contact between surfaces to allow for heat transfer therethrough.

The direct attachment of the metallic heat sinks 82, 86 directly to the first and the second side walls 34, 35 via attachment means 77 provides additional stability to the fusible switch system 50. For example, during short circuit events, which cause the switch to mechanically change from a switch-ON position to a switch-OFF position, the mechanical movement of components within the switch 55 can cause the fusible switch system 50 or portions thereof to shake, rock, and/or otherwise move during the switching. This movement can cause deformations in the components of the system that can adversely affect performance. The positioning and connection of the metallic heat sinks 82, 86 provides additional stability and support, which prevents and/or minimizes the effects of the switching or extreme forces which occur during the short circuit events.

Alternatively, the first and the second metallic heat sinks 82, 86 can be positioned to substantially abut the first and the second side walls 34, 35 without being directly attached to any of the walls 32-37. By substantially abut, it is meant that the end portions 82*d,e* and 86*d,e* of the first and the second metallic heat sinks 82, 86 are positioned in close proximity to the walls 34, 35, such as for example, within 0.5 inches or less including the end portions 82*d,e* and 86*d,e* of the first and the second metallic heat sinks 82, 86 physically contacting the walls 34, 35.

Optionally, to ensure a sufficient surface-to-surface thermal transfer connection between the first electrical insulator 84 and the first surfaces 74*a-c* of the busbars 70*a-c* and between the second electrical insulator 88 and the second opposing surfaces 75*a-c* of the busbars 70*a-c*, one or more heat-sink clamps 89 can be included in the heat sink system 80. For example, one or more heat-sink clamps 89 can be positioned to hold, force, and or bias the first metallic heat sink 82 in a first direction towards the first surfaces 74*a-c* of the busbars 70*a-c* and to hold, force, and/or bias the second metallic heat sink 86 in a second opposing direction towards the second opposing surfaces 75*a-c* of the busbars 70*a-c* such that the first and the second metallic heat sinks 82, 86 sandwich the busbars 70*a-c* with the first and the second insulators 84, 88 therebetween. Put another way, the one or more heat-sink clamps 89 can be positioned to bias the first metallic heat sink 82 in a first direction and to bias the second metallic heat sink 86 in a second opposing direction such that the first and the second insulators 84, 88 remain in physical contact with the busbars 70a-c. The clamps can be made from a metallic material (e.g., steel, copper, iron, nickel, aluminum, etc.) or non-metallic material (e.g., plastic, rubber, etc.).

Figure 6:
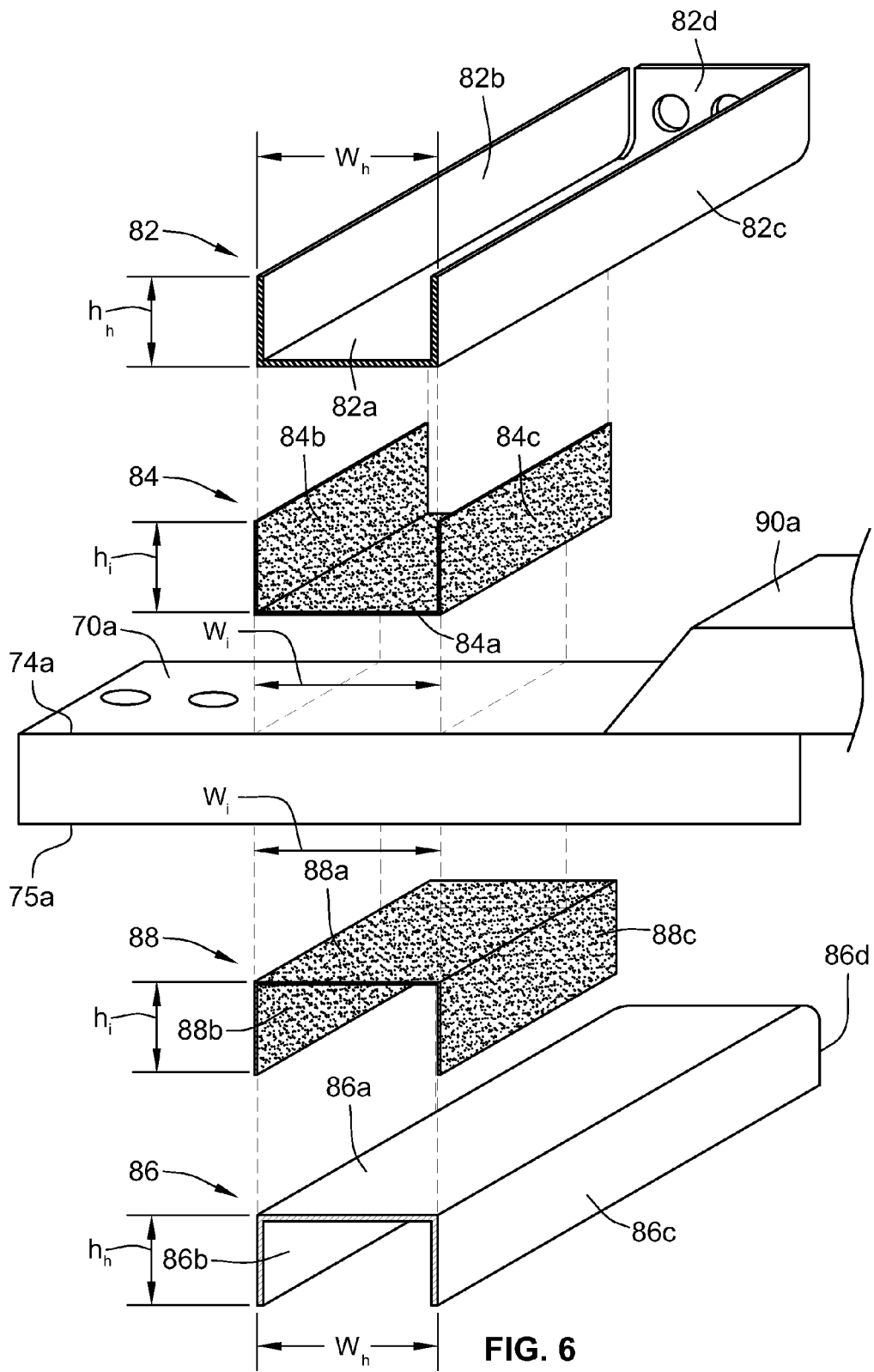
FIG. 6 is an exploded cross-sectional view of the heat sink system coupled to the portion of the fusible switch system of FIG. 5.

Referring also to FIG. 6, an exploded cross-sectional view of the heat sink system 80 and a portion of the fusible switch system 50 (the first busbar 70a and the first lug 90a) is shown. The first metallic heat sink 82, the second metallic heat sink 86, the first electrical insulator 84, and the second electrical insulator 88 each have a base portion and two leg portions protruding from the base portion that forms a generally "U" shaped cross-section as described below. Specifically, the first metallic heat sink 82 includes a heat-sink-base portion 82a and a first and a second heat-sink-leg portion 82b,c protruding therefrom, the second metallic heat sink 86 includes a heat-sink-base portion 86a and a first and a second heat-sink-leg portion 86b,c protruding therefrom, the first electrical insulator 84 includes an insulator-base portion 84a and a first and a second insulator-leg portion 84b,c protruding therefrom, and the second electrical insulator 88 includes an insulator-base portion 88a and a first and a second insulator-leg portion 88b,c protruding therefrom. By protruding therefrom, it is meant that the leg portions are non-parallel with the base portions. For example, the heat-sink-base portion 82a of the first metallic heat sink 82 has an outer surface that is non-parallel to an outer surface of the first heat-sink-leg portion 82b and is also non-parallel to an outer surface of the second heat-sink-leg portion 82c.

Various widths, heights, and thicknesses are contemplated for the first metallic heat sink 82, the second metallic heat sink 86, the first electrical insulator 84, and the second electrical insulator 88 depending on the dimensions of the thermally efficient electrical enclosure 30 and/or the busbars therein.

For example, in a typical PIU, the first metallic heat sink 82 and the second metallic heat sink 86a can have a width, $w_h$, in the range of about 1 inch to about 4 inches and a height, $h_h$, in the range of about 0.5 inches to about 2 inches. Similarly, the first electrical insulator 84 and the second electrical insulator 88 can have a width, $w_i$, in the range of about 1 inch to about 4 inches and a height, N, in the rage of about 0.5 inches to about 2 inches. It is contemplated that a ratio of the width to the height ($w_h/h_h$ and $w_i/h_i$) for each of the first metallic heat sink 82, the second metallic heat sink 86, the first electrical insulator 84, and the second electrical insulator 88 is between about 0.5 and 4.

For another example, the first metallic heat sink 82 and the second metallic heat sink 86 can have a substantially uniform material thickness in the range of about 50 mils to about 400 mils and the first electrical insulator 84 and the second electrical insulator 88 can have a substantially uniform thickness in the range of about 15 mils to about 100 mils. Preferably, the first metallic heat sink 82 and the second metallic heat sink 86a have a substantially uniform thickness in the range of about 90 mils to about 180 mils and the first electrical insulator 84 and the second electrical insulator 88 have a substantially uniform thickness in the range of about 30 mils to about 60 mils. It is contemplated that a ratio of the thickness of the first metallic heat sink 82 or the second metallic heat sink 86 to the thickness of the first electrical insulator 84 or the second electrical insulator 88 is between about 15:1 and 1:1. Preferably, a ratio of the thickness of the first metallic heat sink 82 or the second metallic heat sink 86 to the thickness of the first electrical insulator 84 or the second electrical insulator 88 is between about 6:1 and 2:1.

Whereas the first electrical insulator 84 and the second electrical insulator 88 have a thickness between 30 mils and 60 mils and a thermal conductivity of about 0.2 Watts per meter-Kelvin (W/m·K), the first electrical insulator 84 and the second electrical insulator 88 can have a thermal impedance of 0.1 meters squared-Kelvin per Watt (m²·K/W) or less. Alternately, the first electrical insulator 84 and the second electrical insulator 88 can have a thermal impedance between 0.002 meters squared-Kelvin per Watt (m²·K/W) and 0.1 meters squared-Kelvin per Watt (m²·K/W).

The first electrical insulator 84 and the second electrical insulator 88 can have a dielectric strength of at least three hundred volts per mil (V/mil). Alternatively, the first electrical insulator 84 and the second electrical insulator 88 can have a dielectric strength between three hundred and eighty volts per mil (V/mil) and five hundred volts per mil (V/mil).

The first metallic heat sink 82 and the second metallic heat sink 86 can have a thermal conductivity of at least about 60 Watts per meter-Kelvin (W/m·K). Alternatively, the first metallic heat sink 82 and the second metallic heat sink 86 can have a thermal conductivity between about 16 Watts per meter-Kelvin (W/m·K) and 410 Watts per meter-Kelvin (W/m·K).

Figure 7A:
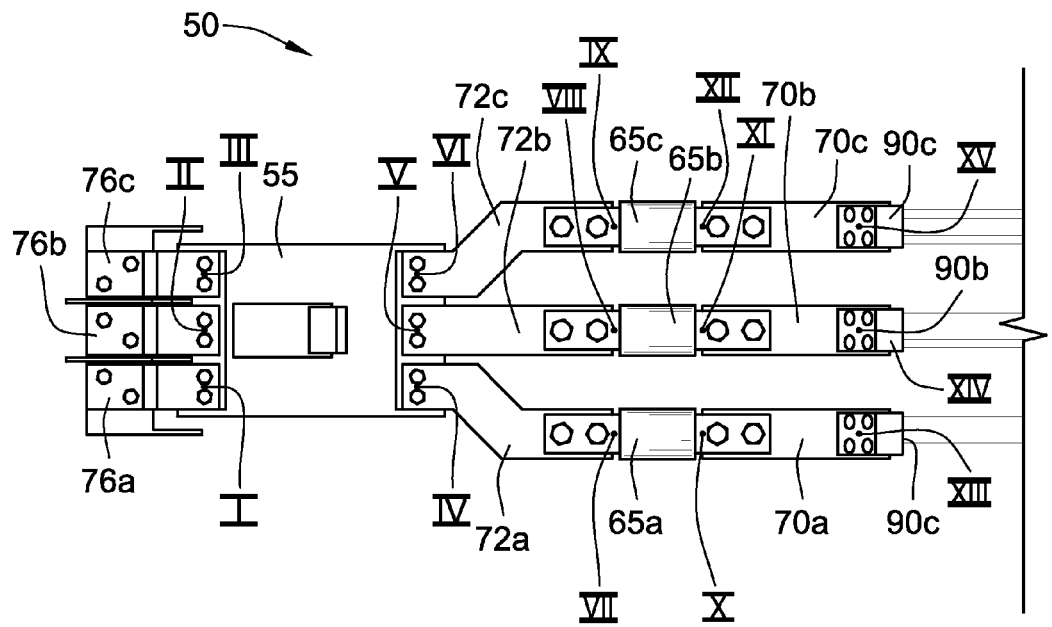
FIG. 7A is a front view of a fusible switch system without a heat sink system.
Figure 7B:
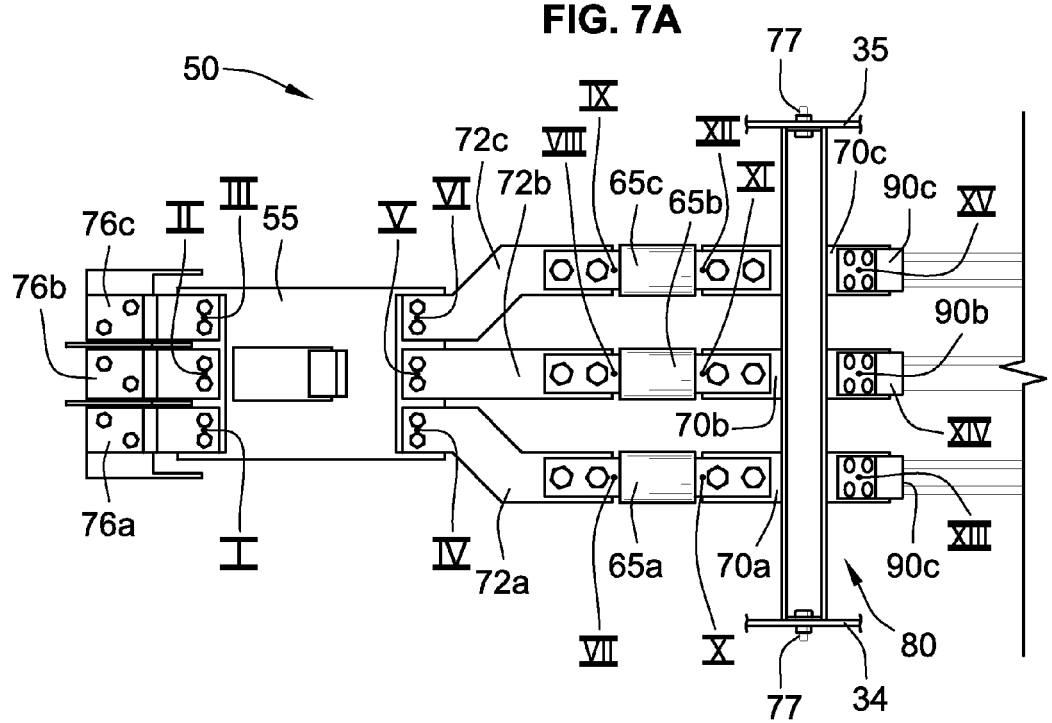
FIG. 7B is a front view of the fusible switch system of FIG. 7A with a heat sink system according to aspects of the present disclosure.

Referring to FIGS. 7A and 7B, a comparison of two steady-state systems under 80% rated loads are shown, where like reference numbers are used as described above for illustrative purposes. FIG. 7A illustrates the fusible switch system 50 without the heat sink system 80 being loaded at 80% of its rated maximum load and FIG. 7B illustrates the fusible switch system 50 coupled the heat sink system 80 being loaded at 80% of its rated maximum load. At steady-state, the temperatures were measured at 15 different points (I to XV) in both systems and the results of the measurements are summarized in the table below.

| Location of Temperature Point | Fusible Switch without Heat Sink System Temperature (° C.) | Fusible Switch with Heat Sink System Temperature (° C.) | Difference in Temperature (° C.) |
| --- | --- | --- | --- |
| I | 82.5 | 80.5 | −2.0 |
| II | 96.6 | 94.3 | −2.3 |
| III | 93.5 | 91.0 | −2.5 |
| IV | 86.7 | 83.7 | −3.0 |
| V | 100.5 | 97.2 | −3.3 |
| VI | 98.9 | 95.1 | −3.8 |
| VII | 90.0 | 86.2 | −3.8 |
| VIII | 103.0 | 99.0 | −4.0 |
| IX | 102.6 | 98.0 | −4.6 |
| X | 81.0 | 74.8 | −6.2 |
| XI | 91.1 | 85.0 | −6.1 |
| XII | 92.7 | 85.7 | −7.0 |
| XIII | 69.9 | 63.6 | −6.3 |
| XIV | 78.7 | 72.5 | −6.2 |
| XV | 80.8 | 73.8 | −7.0 |

As shown in the above table, use of the heat sink system 80 as described herein and as shown in FIGS. 3-6, 7B, 9A, and 9B can result in a temperature reduction of the first, the second, and the third busbars 70a-c between 6 and 7 degrees Celsius at points X to XV. Additionally, use of the heat sink system 80 as described herein and as shown in FIGS. 3-6, 7B, 9A, and 9B can result in a temperature reduction of the fourth, the fifth, and the sixth busbars 72a-c between 3 and 4.6 degrees Celsius at points IV to IX and in a temperature reduction of the seventh, the eighth, and the ninth busbars 76a-c between 2 and 2.5 degrees Celsius at points I to III.

A reduction of busbar temperature and/or of the internal temperature of the thermally efficient electrical enclosure 30 is advantageous at least because it improves the thermal performance of the thermally efficient electrical enclosure 30 and/or the busway system 10, which directly affects the size of the busbars in the thermally efficient electrical enclosure 30 and of the phase-conductors needed in the busway 20. Thus, an improvement of thermal performance of the thermally efficient electrical enclosure 30 and/or the busway system 10 allows for the use of busbars and/or phase-conductors having smaller cross-sectional areas and/or an overall smaller busway architecture within the busway system 10. Smaller and/or lighter phase-conductors and/or busbars can significantly reduce the cost of fabrication as many phase-conductors and/or busbars are made from relatively expensive metals, such as copper and/or aluminum. As such, even a small reduction in cross-sectional area of a phase-conductor and/or busbar can result in a reduction in cost of a busway system and/or electrical enclosure. For example, use of the heat sink system 80 as described herein and as shown in FIGS. 3-6, 7B, 9A, and 9B can result in a 15% to 20% reduction of copper used to make the busbars 70a-c, 72a-c, and 76a-c as compared to the copper used to make the corresponding busbars in a system without the heat sink system 80. The reduction in copper does not reduce the current rating of the busway system, which allows the busway system to handle the same rated current or voltage while significantly reducing the amount of copper used in the busbars 70a-c, 72a-c, and/or 76a-c. The copper savings are multiplied as the number of busbars (and associated electrical phases) are increased in the busway system. For example, in a three-phase busway system, the copper savings are three times higher compared to the copper savings in a single-phase busway system.

Referring to FIGS. 8A, 8B and 9A, 9B, a comparison of two steady-state systems under 80% rated loads are shown, where like reference numbers are used as described above for illustrative purposes. FIGS. 8A and 8B illustrate the fusible switch system 50 without the heat sink system 80 being loaded at 80% of its rated maximum load and FIGS. 9A and 9B illustrate the fusible switch system 50 coupled the heat sink system 80 being loaded at 80% of its rated maximum load. At steady-state, a temperature profile of several components within both systems is shown. The various temperatures of the components and the ambient air inside of the enclosures are represented by different cross hatching patterns as shown in the legend 100.

While the height, $h_i$, of the leg portions 84b,c and 88b,c of the electrical insulators 84 and 88 is shown as being about the same as the height, $h_h$, of the leg portions 82b,c and 86b,c of the first and the second metallic heat sinks 82 and 86, it is contemplated that the height, $h_i$, of the leg portions 84b,c and 88b,c of the first and the second electrical insulators 84 and 88 is less than the height, $h_h$, of the leg portions 82b,c and 86b,c of the first and the second metallic heat sinks 82 and 86. For example, according to some alternative implementations of the present disclosure, the height, $h_i$, of the leg portions 84b,c and 88b,c of the electrical insulators 84 and 88 can be between 10 and 100 percent of the height, $h_h$, of the leg portions 82b,c and 86b,c of the first and the second metallic heat sinks 82 and 86. For another example, according to some alternative implementations of the present disclosure, the height, $h_i$, of the leg portions 84b,c and 88b,c of the electrical insulators 84 and 88 can be between 50 and 90 percent of the height, $h_h$, of the leg portions 82b,c and 86b,c of the first and the second metallic heat sinks 82 and 86. Various other heights, $h_i$, of the leg portions 84b,c and 88b,c of the electrical insulators 84 and 88 are contemplated such that the first and the second electrical insulators 84, 88 electrically insulate the first and the second metallic heat sinks 82, 86 from the busbars 70a-c.

While the first metallic heat sink 82, the second metallic heat sink 86, the first electrical insulator 84, and the second electrical insulator 88 are shown as each having generally "U" shaped cross-section, a variety of other cross-sections are contemplated, such as, for example, an "E" shaped cross-section wherein the first and the second metallic heat sinks 82, 86 each further includes a third heat-sink-leg portion (not shown) protruding from the respective heat-sink-base portions 82a, 86a. For another example, it is contemplated that the heat-sink-leg portions can protrude from the heat-sink-base portion at a variety of angles, such as, between 0 and 180 degrees with respect to the heat-sink-base portion.

While the first and the second electrical insulators 84, 88 are shown as being wrapped around a portion of a length of the first and the second metallic heat sinks 82, 86, respectively, it is contemplated that the entire length of the first and the second metallic heat sinks 82, 86 can be wrapped and/or covered by the first and the second electrical insulators 84, 88.

The thermally efficient electrical enclosure 30 can be a low-voltage enclosure, a medium-voltage enclosure, and/or a high-voltage enclosure with a variety of different current ratings. For example, the thermally efficient electrical enclosure 30 can have a current rating of 20 amps such that the busbars within the thermally efficient electrical enclosure 30 distribute 20 amps. For another example, the thermally efficient electrical enclosure 30 can have a current rating of 100 amps such that the busbars within the thermally efficient electrical enclosure 30 distribute 100 amps. For another example, the thermally efficient electrical enclosure 30 can have a current rating of 200 amps such that the busbars within the thermally efficient electrical enclosure 30 distribute 200 amps. For another example, the thermally efficient electrical enclosure 30 can have a current rating of 500 amps such that the busbars within the thermally efficient electrical enclosure 30 distribute 500 amps. For another example, the thermally efficient electrical enclosure 30 can have a current rating of 1000 amps such that the busbars within the thermally efficient electrical enclosure 30 distribute 1000 amps.

Optionally, the fusible switch system 50 can further include one or more bolt-on heat sinks 68 as shown in FIG. 4. The bolt-on heat sinks 68 are positioned to physically contact respective ones of the busbars 70a-c and 72a-c to aid in conducting heat away from the busbars 70a-c and 72a-c and to the ambient air within the thermally efficient electrical enclosure 30.

While the thermally efficient electrical enclosure 30 is illustrated as a fusible-switch PIU, it is contemplated that the thermally efficient electrical enclosure 30 can be, for example, other types of PIUs, a bolt-on unit, a fuse box, etc. Where the thermally efficient electrical enclosure is a fuse box, the fuse box does not include a busway coupler.

While the thermally efficient electrical enclosure 30 is shown as having a generally rectangular-box shape, a variety of other shapes for the thermally efficient electrical enclosure 30 are contemplated, such as, for example, square-box, circular-box, oval-box, triangular-box, or any other box shape including irregular box-shapes where one or more of the walls has an irregular shape.

While particular aspects, embodiments, and applications of the present disclosure have been illustrated and described, it is to be understood that the invention is not limited to the precise construction and compositions disclosed herein and that various modifications, changes, and variations may be apparent from the foregoing exemplary descriptions without departing from the spirit and scope of the invention as defined in the appended claims.

What is claimed is:

1. A thermally efficient electrical enclosure, comprising:
    a busbar positioned entirely within the enclosure and electrically insulated from the enclosure;
    a metallic heat sink substantially abutting a wall of the enclosure and positioned adjacent the busbar so as to move heat away from the busbar and towards the wall of the enclosure; and
    an electrical insulator electrically insulating the metallic heat sink from the busbar.

2. The thermally efficient electrical enclosure of claim 1, wherein the metallic heat sink is physically attached to the wall of the enclosure via one or more attachment means.

3. The thermally efficient electrical enclosure of claim 1, wherein the electrical insulator physically contacts the busbar and is at least partially wrapped around at least two surfaces of a portion of the metallic heat sink non-parallel with a heat-sink-base portion such that the metallic heat sink is electrically insulated from the busbar.

4. The thermally efficient electrical enclosure of claim 1, wherein the metallic heat sink has a thermal conductivity of about 60 Watts per meter Kelvin (W/m·K), the electrical insulator comprises a material having a thermal impedance of at least 0.002 meters squared-Kelvin per Watt (m$^2$·K/W), and a dielectric strength of at least 300 volts per mil (V/mil).

5. The thermally efficient electrical enclosure of claim 1, wherein heat generated by current passing through the busbar is transferred from the busbar to the electrical insulator to the metallic heat sink to the enclosure, and wherein the enclosure is substantially airtight, watertight, or both.

6. The thermally efficient electrical enclosure of claim 1, wherein the metallic heat sink substantially abuts the wall of the enclosure such that heat is conducted from the metallic heat sink to the wall of the enclosure.

7. The thermally efficient electrical enclosure of claim 1, wherein the metallic heat sink includes a heat-sink-base portion and two heat-sink-leg portions protruding from the heat-sink-base portion that form a generally "U" shaped cross-section with a substantially uniform thickness.

8. The thermally efficient electrical enclosure of claim 7, wherein the electrical insulator includes an insulator-base portion and two insulator-leg portions protruding from the insulator-base portion that form a generally "U" shaped cross-section with a substantially uniform thickness, the insulator-base portion physically contacting at least a portion of the heat-sink-base portion, a first one of the insulator-leg portions physically contacting at least a portion of a first one of the heat-sink-leg portions, and a second one of the insulator-leg portions physically contacting at least a portion of a second one of the heat-sink-leg portions, and wherein the insulator-base portion physically contacts the busbar and the two insulator-leg portions do not physically contact the busbar.

9. The thermally efficient electrical enclosure of claim 8, wherein the busbar has a first end, an opposing second end, a top surface, a bottom surface, and two opposing side surfaces, and wherein the electrical insulator has a length dimension that is generally perpendicular to a length dimension of the busbar such that the length dimension of the electrical insulator extends beyond both of the two opposing side surfaces of the busbar.

10. The thermally efficient electrical enclosure of claim 1, wherein the electrical insulator is composed of a polycarbonate resin thermoplastic.

11. The thermally efficient electrical enclosure of claim 1, wherein the electrical insulator is about 30 mils thick and wherein the metallic heat sink is about 90 mils thick.

12. The thermally efficient electrical enclosure of claim 1, wherein the metallic heat sink is made from steel.

13. The thermally efficient electrical enclosure of claim 1, wherein a thickness of the metallic heat sink is at least about two times larger than a thickness of the electrical insulator.

14. A thermally efficient electrical enclosure, comprising:
    a busbar positioned entirely within the enclosure and electrically insulated from the enclosure, the busbar being configured to conduct a phase of electricity between a source and a load;
    a first metallic heat sink substantially abutting a wall of the enclosure;
    a second metallic heat sink substantially abutting the wall of the enclosure;
    a first insulator physically contacting a first side of the busbar and at least partially wrapped around at least two surfaces of a portion of the first metallic heat sink non-parallel with a heat-sink-base portion of the first metallic heat sink such that the first metallic heat sink is electrically insulated from the busbar; and
    a second insulator physically contacting a second opposing side of the busbar and at least partially wrapped around at least two surfaces of a portion of the second metallic heat sink non-parallel with a heat-sink-base portion of the second metallic heat sink such that the second metallic heat sink is electrically insulated from the busbar.

15. The thermally efficient electrical enclosure of claim 14, further comprising one or more heat-sink clamps configured to bias the first metallic heat sink in a first direction and to bias the second metallic heat sink in a second direction opposing the first direction such that the first and the second insulators remain in physical contact with the busbar and wherein the first and the second metallic heat sinks are further attached to a second wall opposing the wall of the enclosure.

16. A thermally efficient fusible switch, comprising:
    an enclosure;
    three substantially parallel busbars positioned entirely within the enclosure and electrically insulated from the enclosure and from each other, each of the three substantially parallel busbars being configured to conduct a separate phase of electricity;
    three fuses, each one of the fuses being electrically coupled to a respective one of the three substantially parallel busbars;
    a switch electrically coupled to the three fuses;
    a first metallic heat sink physically attached to a wall of the enclosure;
    a second metallic heat sink physically attached to the wall of the enclosure;
    a first insulator physically contacting respective first surfaces of the three substantially parallel busbars and physically contacting at least a portion of the first metallic heat sink such that the first metallic heat sink is electrically insulated from the three substantially parallel busbars; and
    a second insulator physically contacting respective second surfaces of the three substantially parallel busbars, the respective second surfaces opposing the respective first surfaces of the three busbars, and physically contacting at least a portion of the second metallic heat sink such that the second metallic heat sink is electrically insulated from the three substantially parallel busbars.

17. The thermally efficient fusible switch of claim 16:
wherein each of the first and the second metallic heat sinks includes a heat-sink-base portion and two heat-sink-leg portions protruding from the heat-sink-base portion that form a generally "U" shaped cross-section with a substantially uniform thickness, and
wherein each of the first and the second insulators includes an insulator-base portion and two insulator-leg portions protruding from the insulator-base portion that form a generally "U" shaped cross-section with a substantially uniform thickness, and
wherein the insulator-base portion of the first insulator physically contacts at least a portion of the heat-sink-base portion of the first metallic heat sink, a first one of the insulator-leg portions of the first insulator physically contacts at least a portion of a first one of the heat-sink-leg portions of the first metallic heat sink, and a second one of the insulator-leg portions of the first insulator physically contacts at least a portion of a second one of the heat-sink-leg portions of the first metallic heat sink, and
wherein the insulator-base portion of the first insulator physically contacts the respective first surfaces of the three substantially parallel busbars and the two insulator-leg portions of the first insulator do not physically contact the respective first surfaces of the three substantially parallel busbars, and
wherein the insulator-base portion of the second insulator physically contacts at least a portion of the heat-sink-base portion of the second metallic heat sink, a first one of the insulator-leg portions of the second insulator physically contacts at least a portion of a first one of the heat-sink-leg portions of the second metallic heat sink, and a second one of the insulator-leg portions of the second insulator physically contacts at least a portion of a second one of the heat-sink-leg portions of the second metallic heat sink, and
wherein the insulator-base portion of the second insulator physically contacts the respective second opposing surfaces of the three substantially parallel busbars and the two insulator-leg portions of the second insulator do not physically contact the respective second opposing surfaces of the three substantially parallel busbars, and
wherein each of the three substantially parallel busbars has a first end, an opposing second end, a top surface, a bottom surface, a first side surface, and a second opposing side surface, and wherein the first and the second insulators each has a length dimension that is generally perpendicular to a length dimension of each of the three substantially parallel busbars such that the length dimension of the first and the second insulator extends beyond the first and the second opposing side surfaces of each of the three substantially parallel busbars.

18. The thermally efficient fusible switch of claim 16, wherein the first and the second insulators comprise a material having a thermal impedance of at least 0.002 meters squared-Kelvin per Watt ($m^2 \cdot K/W$) and a dielectric strength of at least 300 volts per mil (V/mil).

19. The thermally efficient fusible switch of claim 16, wherein the first and the second insulators comprise a material having a thermal impedance equal to or less than 0.1 meters squared-Kelvin per Watt ($m^2 \cdot K/W$).

20. The thermally efficient fusible switch of claim 16, wherein the first and the second insulators comprise a material having a dielectric strength between 380 volts per mil (V/mil) and 500 volts per mil (V/mil).

* * * * *